(12) United States Patent
Huang et al.

(10) Patent No.: US 10,275,742 B2
(45) Date of Patent: Apr. 30, 2019

(54) METHODS AND DEVICES FOR MANAGING EMAILS

(71) Applicant: TENCENT TECHNOLOGY (SHENZHEN) COMPANY LIMITED, Shenzhen (CN)

(72) Inventors: Tieming Huang, Shenzhen (CN); Yongfeng Wang, Shenzhen (CN); Jiajian Xu, Shenzhen (CN); Shaohua Luo, Shenzhen (CN); Xi Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 221 days.

(21) Appl. No.: 15/100,207

(22) PCT Filed: Nov. 13, 2014

(86) PCT No.: PCT/CN2014/091041
§ 371 (c)(1),
(2) Date: May 27, 2016

(87) PCT Pub. No.: WO2015/078303
PCT Pub. Date: Jun. 4, 2015

(65) Prior Publication Data
US 2017/0032320 A1 Feb. 2, 2017

(30) Foreign Application Priority Data
Nov. 29, 2013 (CN) .......................... 2013 1 0628004

(51) Int. Cl.
*G06Q 10/10* (2012.01)
*H04L 29/12* (2006.01)
(Continued)

(52) U.S. Cl.
CPC ....... *G06Q 10/107* (2013.01); *G06Q 30/0277* (2013.01); *H04L 51/12* (2013.01);
(Continued)

(58) Field of Classification Search
CPC ..... H04L 51/12; H04L 51/22; H04L 61/1511; H04L 63/0227; H04L 63/0236; G06Q 10/107; G06Q 30/0277
(Continued)

(56) References Cited

U.S. PATENT DOCUMENTS

2002/0188689 A1* 12/2002 Michael ............... G06Q 10/107
709/206
2003/0182383 A1* 9/2003 He ....................... G06Q 10/107
709/206
(Continued)

FOREIGN PATENT DOCUMENTS

CN 1437141 A 8/2003
CN 1707492 A 12/2005
(Continued)

OTHER PUBLICATIONS

The State Intellectual Property Office of the People's Republic of China (SIPO) Office Action 1 for 201310628004.X dated Jan. 11, 2018 13 Pages (including translation).
(Continued)

*Primary Examiner* — Chris Parry
*Assistant Examiner* — Weiwei Y Stiltner
(74) *Attorney, Agent, or Firm* — Anova Law Group, PLLC (57) ABSTRACT

Methods and devices for email management are provided. According to email information of emails in an email box, whether an email box contains advertisement emails is determined. The email information at least contains sender addresses of the emails. When the email box contains the
(Continued)

advertisement emails, classification data of the advertisement emails are obtained by obtaining the email information of the advertisement emails and classifying the advertisement emails, according to the sender addresses thereof, to form advertisement-email sets with each set containing at least one advertisement email. The at least one advertisement email in a same advertisement-email set has a same sender address. The advertisement emails are displayed according to the classification data thereof. Accordingly, the email managing device includes a determining module, an obtaining module, and a displaying module.

19 Claims, 4 Drawing Sheets

(51) Int. Cl.
    *H04L 12/58* (2006.01)
    *H04L 29/06* (2006.01)
    *G06Q 30/02* (2012.01)

(52) U.S. Cl.
    CPC .......... *H04L 51/22* (2013.01); *H04L 61/1511* (2013.01); *H04L 63/0227* (2013.01); *H04L 63/0236* (2013.01)

(58) Field of Classification Search
    USPC .......................................................... 709/206
    See application file for complete search history.

(56) References Cited

U.S. PATENT DOCUMENTS

| | | | |
|---|---|---|---|
| 2006/0085504 A1* | 4/2006 | Yang | H04L 51/12 709/206 |
| 2006/0253597 A1* | 11/2006 | Mujica | G06Q 10/107 709/229 |
| 2007/0143411 A1* | 6/2007 | Costea | G06Q 10/107 709/206 |
| 2008/0270548 A1* | 10/2008 | Glickstein | G06Q 10/107 709/206 |
| 2011/0271349 A1* | 11/2011 | Kaplan | H04L 51/12 726/26 |
| 2013/0018964 A1* | 1/2013 | Osipkov | G06Q 10/107 709/206 |
| 2013/0086181 A1* | 4/2013 | Vitaldevara | G06Q 10/107 709/206 |
| 2013/0117098 A1* | 5/2013 | Madsen | G06Q 30/0201 705/14.39 |
| 2013/0159082 A1* | 6/2013 | Abbott | G06Q 10/107 705/14.25 |
| 2015/0033141 A1* | 1/2015 | Mishra | H04L 51/22 715/752 |
| 2015/0100644 A1* | 4/2015 | Gulik | H04L 51/22 709/206 |
| 2015/0200899 A1* | 7/2015 | Sanketi | H04L 51/24 709/206 |

FOREIGN PATENT DOCUMENTS

| | | |
|---|---|---|
| CN | 1845133 A | 10/2006 |
| CN | 101488198 A | 7/2009 |
| CN | 101540773 A | 9/2009 |
| CN | 101068217 B | 6/2010 |
| CN | 103250115 A | 8/2013 |

OTHER PUBLICATIONS

Baidu experience, How to use QQ self-service inquiries, https://jingyan.baidu.com/article/93f9803ff5a9c3e0e46f55fa.html, Sep. 1, 2013 pp. 3-4 (10 pages including translation).

The World Intellectual Property Organization (WIPO). International Search Report for PCT/CN2014/091041 dated Jan. 30, 2015

\* cited by examiner

FIG.7

METHODS AND DEVICES FOR MANAGING EMAILS

CROSS-REFERENCES TO RELATED APPLICATIONS

This application claims priority to PCT Application No. PCT/CN2014/091041, filed on Nov. 13, 2014, which claims priority Chinese Patent Application No. 201310628004X, filed on Nov. 29, 2013. The entire content of the two applications is incorporated herein by reference.

FIELD OF THE DISCLOSURE

The present disclosure generally relates to the field of network technology and, more particularly, relates to methods and devices for managing emails.

BACKGROUND

With the development of network technology, emails have been commonly used for communications. In addition to sending and receiving mails, email addresses are often used to register various websites or web-based applications. These websites or web-based applications may push information to users registered via email addresses. The users may then receive many advertisement emails, such as massive promotion emails, account registration-type emails, password modification-type emails, etc. Often, existing email systems do not recognize and manage advertisement emails as desired. When receiving advertisement emails, some email systems may store the advertisement emails as normal emails without distinguishing and/or separating them from normal emails. Consequently, a large amount of advertisement emails may be stored and displayed in an email inbox.

Currently, when handling advertisement emails, all emails in the email inbox need to be individually identified one after another. As a large amount of advertisement emails may be in an email inbox, such process for handling advertisement emails is time-consuming and has low processing efficiency.

BRIEF SUMMARY OF THE DISCLOSURE

One aspect or embodiment of the present disclosure includes an email management method. Whether an email box contains one or more advertisement emails is determined according to email information of emails in an email box. The email information at least contains sender addresses of the emails. When the email box contains the one or more advertisement emails, classification data of the one or more advertisement emails are obtained by obtaining the email information of the one or more advertisement emails and classifying the one or more advertisement emails, according to the sender addresses thereof, to form one or more advertisement-email sets with each set containing at least one advertisement email. The at least one advertisement email in a same advertisement-email set has a same sender address. The one or more advertisement emails are displayed according to the classification data thereof.

Another aspect or embodiment of the present disclosure includes an email managing device. The email managing device includes a determining module, an obtaining module, and a displaying module. The determining module is configured to determine whether the email box contains one or more advertisement emails according to email information of emails in an email box. The email information at least contains sender addresses of the emails. The obtaining module is configured, when the email box contains the one or more advertisement emails, to obtain classification data of the one or more advertisement emails. The obtaining module includes a first obtaining unit configured to obtain the email information of the one or more advertisement emails, and a classifying unit configured to classify the one or more advertisement emails, according to the sender addresses thereof, to form one or more advertisement-email sets with each set containing at least one advertisement email. The at least one advertisement email in a same advertisement-email set has a same sender address. The displaying module is configured to display the one or more advertisement emails according to the classification data thereof.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
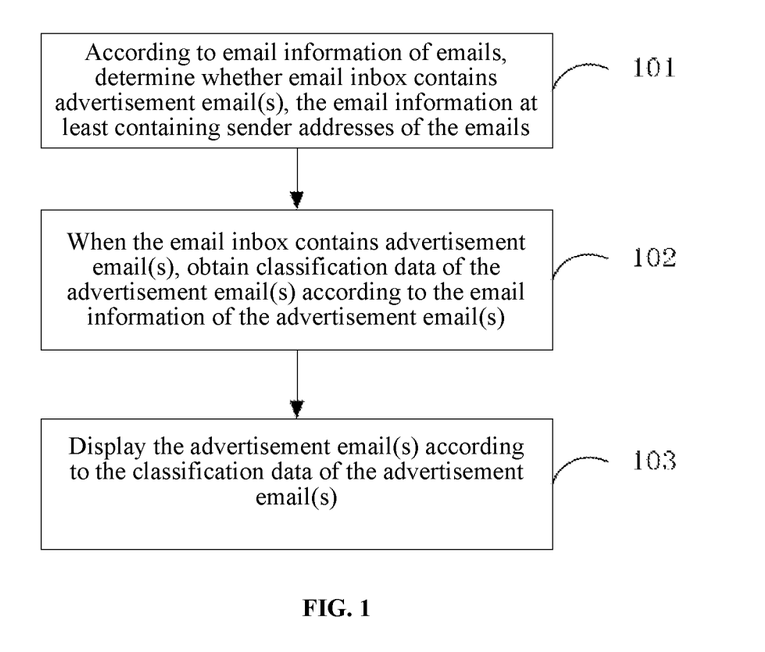
FIG. 1 depicts an exemplary email management method consistent with various disclosed embodiments.

FIGS. 1-7 depict exemplary methods, devices (e.g., server devices), and systems for managing emails consistent with various disclosed embodiments. For example, FIG. 1 depicts an exemplary email management method.

In Step 101, according to email information of emails in an email box, it is determined whether the email box contains one or more advertisement emails. The email information at least contains sender addresses of the emails. The email box can be, for example, an email inbox, or any suitable email folder that can receive and/or store emails.

The advertisement emails may be various types. In some cases, the advertisement emails may include useful information a computer user has asked for and/or wants to read. In some cases, the advertisement emails may include useful information a computer user has not asked for, but still wants to read after the advertisement emails are received. In some cases, the advertisement emails may include unsolicited bulk emails and/or spam emails that a computer user does not want to read. In various embodiments, the advertisement emails may include massive commercial promotion emails, account registration-type emails, password modification-type emails, etc.

In Step 102, when the email box contains one or more advertisement emails, according to the email information of the one or more advertisement emails, classification data of the one or more advertisement emails are obtained.

In Step 103, the one or more advertisement emails are displayed according to the classification data of the one or more advertisement emails.

The disclosed method for email management can organize/sort email information of advertisement emails in the email box to obtain classification data of the advertisement emails. According to the classification data, advertisement emails can be displayed all together for the user to process the advertisement emails all together without individually identifying the emails one after another. Such process for handling advertisement emails can be convenient and fast with improved processing efficiency.

Optionally, to obtain the classification data of the one or more advertisement emails according to the email information of the one or more advertisement emails, the email information of the one or more advertisement emails can be obtained. One or more advertisement-email sets can be obtained by classifying the one or more advertisement emails according to the sender addresses contained in the email information of the one or more advertisement emails. Each advertisement-email set can contain at least one advertisement email, and the at least one advertisement email in a same advertisement-email set can have a same sender address. Email amount of the at least one advertisement email in each advertisement-email set can then be counted.

Optionally, after obtaining the email information of the one or more advertisement emails, domain name information corresponding to the sender addresses can be obtained according to the sender addresses.

Optionally, after counting the email amount of the at least one advertisement email in each advertisement-email set, a sorting position of each advertisement-email set can be obtained according to an order from high to low of the email amount of the at least one advertisement email in each advertisement-email set.

Optionally, the email information of the one or more advertisement emails can further contain an email-receiving time and an email subject. After obtaining the email information of the one or more advertisement emails, a most-recently received advertisement email in the one advertisement-email set can be determined according to the email-receiving times of the at least one advertisement email in one advertisement-email set. The email subject of the most-recently received advertisement email can be used as a displaying title for the advertisement-email set.

Optionally, whether the email box contains the one or more advertisement emails can be determined: when an inquiry instruction for inquiring an advertisement email is received; and/or after every interval of a pre-set period of time; and/or when the email box receives a newly-added advertisement email.

Optionally, when the email box is determined that does not contain any advertisement email, a notification message can be outputted to notify that the email box does not contain any advertisement email.

Optionally, after obtaining the email information of the one or more advertisement emails, the email information of the one or more advertisement emails can be cached. In some embodiments, when a time reaches a first pre-set time interval, the cached email information of the one or more advertisement emails can be deleted, e.g., when the advertisement emails include unsolicited bulk emails and/or spam emails. In other embodiments, when a time reaches a first pre-set time interval, the cached email information of the one or more advertisement emails can be handled, e.g., saved, in a specific folder as desired, when the advertisement emails include useful information a computer user wants to read. In still other embodiments, when a time reaches a first pre-set time interval, the cached email information of some advertisement emails can be deleted, and the cached email information of other advertisement emails can be saved or otherwise handled.

Optionally, after obtaining classification data of the one or more advertisement emails, the classification data of the one or more advertisement emails can be cached. In some embodiments, when a time reaches a second pre-set time interval, the cached classification data of the one or more advertisement emails can be deleted, e.g., when the advertisement emails include unsolicited bulk emails and/or spam emails. In other embodiments, when a time reaches a second pre-set time interval, the cached classification data of the one or more advertisement emails can be handled, e.g., saved, in a specific folder as desired, when the advertisement emails include useful information a computer user wants to read. In still other embodiments, when a time reaches a second pre-set time interval, the cached classification data of some advertisement emails can be deleted, and the cached classification data of other advertisement emails can be saved or otherwise handled.

In various embodiments, whether an email in the email box is the advertisement email can be determined when following conditions are all satisfied for the email having the sender address that: a history amount of recipients of the email sent from the sender address is greater than a first pre-set threshold value; a ratio of a history amount for sending the email over the history amount of the recipients is greater than a second pre-set threshold value; and a ratio of a history amount for receiving the email over the history amount of the recipients is less than a third pre-set threshold value.

Alternatively, whether an email in the email box is the advertisement email can be determined when following conditions are all satisfied for the email having the sender address that: a history amount of recipients of the email sent from the sender address is greater than a first pre-set threshold value; a ratio of a history amount for reading the email over a history amount of the recipients is greater than a second pre-set threshold value; and a ratio of a history amount for receiving the email over the history amount of the recipients is less than the third pre-set threshold value.

Figure 2:
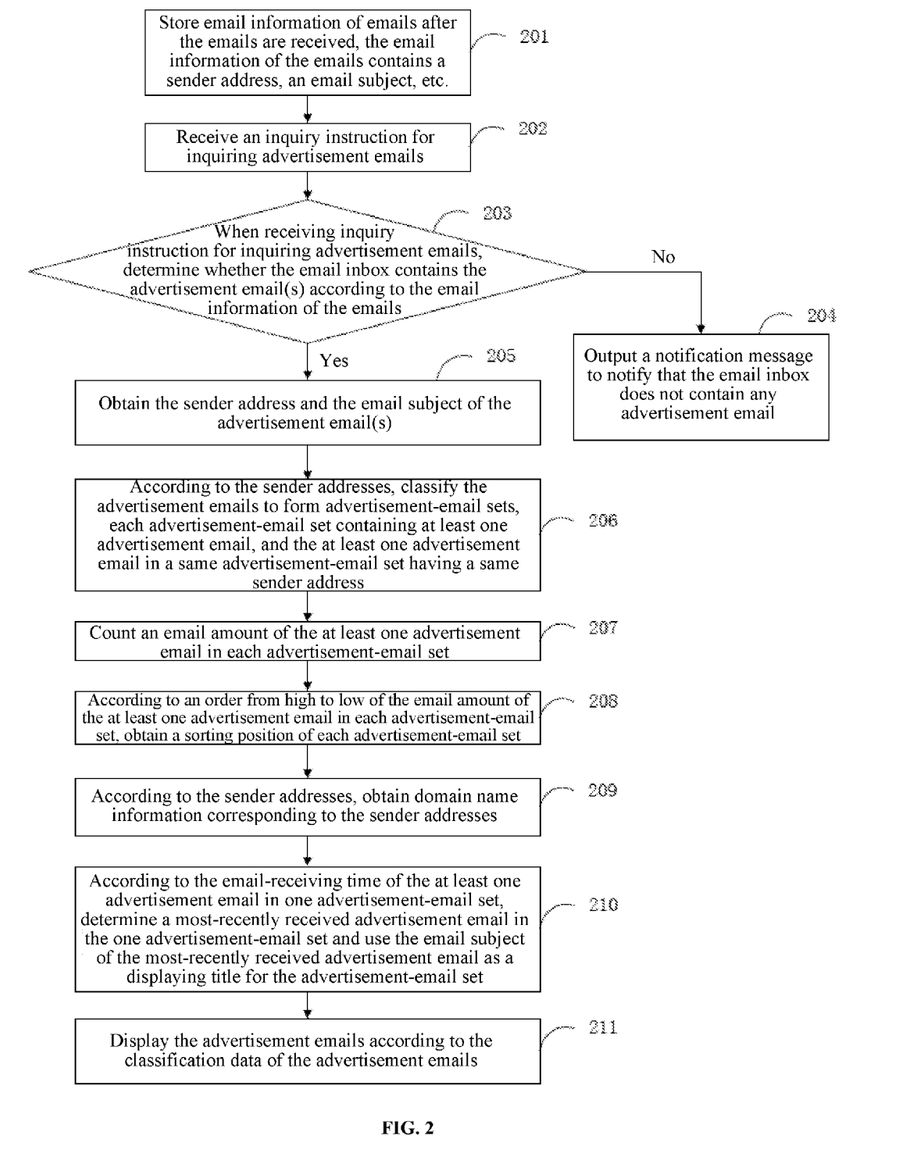
FIG. 2 depicts another exemplary email management method consistent with various disclosed embodiments.

FIG. 2 depicts another exemplary email management method consistent with various disclosed embodiments. For example, the disclosed method can be implemented by an email managing server for receiving/sending emails. In one embodiment, the server can be an email server.

In Step 201, email information of emails can be stored after the emails are received. The email information of the emails can contain a sender address, an email subject, etc.

When the server receives an email sent to a certain email box, the server can store the sender address and the email subject in a storage area corresponding to the email box.

In addition, according to a suffix (e.g., a domain name corresponding to the sender address) of the sender address of said email, the server can obtain domain name information corresponding to the sender address. The domain name information can be a source name of a web site corresponding to the domain name and/or a URL corresponding to the domain name.

Figure 3:
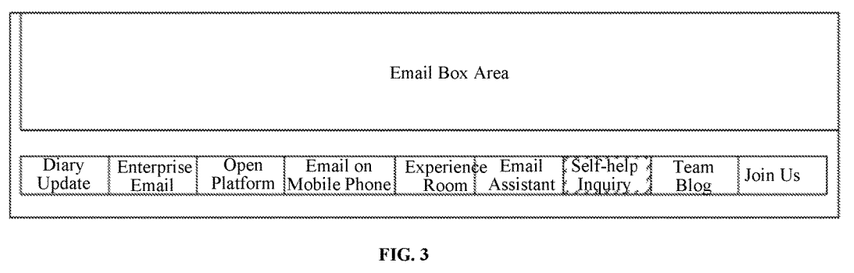
FIG. 3 depicts an exemplary inquiry page for inquiring advertisement emails consistent with various disclosed embodiments.
Figure 4:
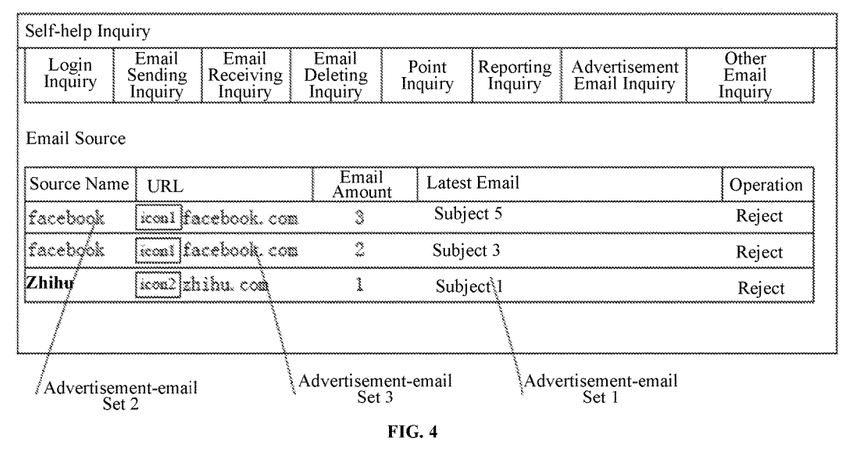
FIG. 4 depicts an exemplary email homepage consistent with various disclosed embodiments.

In Step 202, an inquiry instruction for inquiring an advertisement email can be received. To allow a user to manage and process advertisement emails all together, the server can provide data for displaying email webpage on an email interface (e.g., on a terminal device) to include a self-help inquiry option on an email homepage (e.g., as shown in FIG. 3). When a user clicks on the self-help inquiry option, a self-help inquiry webpage can be accessed. The self-help inquiry webpage can include an advertisement email inquiry option (e.g., as shown in FIG. 4). When the user clicks on the advertisement email inquiry option, the server can receive the inquiry instruction for inquiring the advertisement email sent from the terminal device.

The webpage shown in FIG. 3 can be a webpage portion of the email homepage. Such webpage can include options such as, for example, diary update, enterprise email, open platform, email on a mobile phone, experience room, email assistant, self-help inquiry, team blog, and/or join us. The exemplary email homepage in FIG. 3 contains nine options, among them the self-help inquiry option of the seventh option can be used as an example for illustration purposes. However, the number of options provided and displayed on the email home page and positions of each option such as the self-help inquiry option are not limited.

FIG. 4 shows an exemplary self-help inquiry webpage. Such self-help inquiry webpage can include login inquiry, email sending inquiry, email receiving inquiry, email deleting inquiry, point accumulating inquiry, reporting inquiry, advertisement email inquiry, and other suitable inquiry options. The exemplary self-help inquiry webpage in FIG. 4 contains eight options, among them the advertisement email inquiry option (e.g., of the seventh option) can be used as an example for illustration purposes. However, the number of options provided and displayed on the self-help inquiry webpage and portions of each option such as the advertisement email inquiry option are not limited.

Thus, in some embodiments, whether the email box contains the one or more advertisement emails can be determined when an inquiry instruction for inquiring an advertisement email is received. In other embodiments, whether the email box contains the one or more advertisement emails can be determined after every interval of a pre-set period of time. In this case, all emails received before the time point can be considered, according to a receiving time. Of course, whether the email box contains the one or more advertisement emails can be determined only according to emails received during the pre-set period of time. In other cases, when the email box receives a newly-added advertisement email whether the email box contains the one or more advertisement emails can be determined to organize/sort emails in real-time.

In Step 203, when receiving the inquiry instruction for inquiring the advertisement emails, it is determined whether the email box contains the one or more advertisement emails, according to the email information of the emails in the email box.

When the email box does not contain the one or more advertisement emails, Step 204 can be implemented. When the email box contains the one or more advertisement emails, Step 205 can be implemented.

In Step 203, according to the sender address in the email information of the emails in the email box, the server can determine whether the emails in the email box are advertisement emails one after another. When at least one email in the email box is an advertisement email, the server determines that the email box contains the advertisement email. When any email in the email box is not an advertisement email, the server determines that the email box does not contain any advertisement email.

In addition, the server can determine whether the email in the email box is an advertisement email by the following three exemplary methods.

In an exemplary method (I), according to the sender address of the email, the server can determine whether an address listing of all history advertisement emails contains the sender address of the email. When the address listing of the history advertisement emails contains the sender address of the email, the server can determine that the email is the advertisement email. When the address listing of the history advertisement emails does not contain the sender address of the email, the server can determine that the email is not the advertisement email. The address listing of history advertisement emails can record the sender address of the advertisement email already determined by the server, and stored on the server.

In an exemplary method (II), to determine an email in the email box is an advertisement email, the sender address of the email should satisfy all of the following conditions: (1) all history amount of recipients of the email sent from this sender address is greater than a first pre-set threshold value; (2) a ratio of all history amount for sending the email over the all history amount of the recipients is greater than a second pre-set threshold value, or a ratio of all history amount for reading the email over the all history amount of the recipients is greater than the second pre-set threshold value; and (3) the ratio of the all history amount for receiving the email over the all history amount of the recipients is less than the third pre-set threshold value.

When this sender address of the email satisfies the above-mentioned all three conditions at the same time, the server determines that the email is the advertisement email. When this sender address of the email does not satisfy any of the above-mentioned three conditions, the server determines that the email is not the advertisement email.

In various embodiments, the first pre-set threshold value, the second pre-set threshold value, and the third pre-set threshold value can be configured when originally developed. Alternatively, the first pre-set threshold value, the second pre-set threshold value, and the third pre-set threshold value can be configured and/or adjusted by a user during operation, without any limitations. In an exemplary embodiment, the first pre-set threshold value can be set as 1000, the second pre-set threshold value can be set as 1.2, and the third pre-set threshold value can be set as 0.2.

For example, in an embodiment when the first pre-set threshold value is set as 1000, the second pre-set threshold value is set as 1.2, and the third pre-set threshold value is set as 0.2, a sender address of an email A can be address1@facebook.com. A total history amount of recipients of emails (i.e., a total amount of recipients of history emails) sent from this sender address can be 2000, a total history amount for sending the email can be 3000, and a total history amount for receiving the email can be 200. The server can calculate to obtain: (1) the history amount of recipients of the emails sent from the sender address is 2000, greater than 1000; (2) the history amount for sending the emails is 3000, the ratio over the history amount of the recipients is 3000/2000=1.5, greater than 1.2; and (3) the history amount for receiving the email is 200, the ratio over the history amount of the recipients is 200/2000=0.1, less than 0.2.

Based on the results calculated by the server, the sender address of email A simultaneously satisfies the above-mentioned three conditions. In this case, the server can determine that email A is an advertisement email.

In addition, the second example can be replaced by the following method to determine whether an email is an advertisement email, for example, according to follow conditions: (a) an amount of recipients is greater than a forth pre-set threshold value; (b) a repeating rate of the recipients is greater than a fifth pre-set threshold value; and (c) a mail-replying rate to sender address of this email is less than a sixth pre-set threshold value. When the sender address of the email satisfies one (or more) of the above-mentioned three conditions (a), (b), and (c), the server determines that the email is an advertisement email. When the sender address of the email does not satisfy any of the above-mentioned three conditions (a), (b), and (c), the server determines that the email is not an advertisement email.

In various embodiments, the forth pre-set threshold value, the fifth pre-set threshold value, and the sixth pre-set threshold value can be configured when originally developed. Alternatively, the forth pre-set threshold value, the fifth pre-set threshold value, and the sixth pre-set threshold value can be configured and/or adjusted by a user during operation, without any limitations. In an exemplary embodiment, the forth pre-set threshold value can be set as 150, the fifth pre-set threshold value can be set as 20%, and the sixth pre-set threshold value can be set as 1%.

In an exemplary method (III), the above described examples (I) and (II) can be combined to determine whether an email is an advertisement email. In one embodiment, the server can first determine whether the email is the advertisement email according to method (I). When the email is determined as an advertisement email according to method (I), the server determines that the email is an advertisement email. The address listing of the history advertisement emails can (or can only) record the sender address of the advertisement emails that are already determined by the server. However, when the email is not determined as an advertisement email according to method (I), and in a case that this email is an advertisement email but received (by the server in the email box) after the latest update of the address listing of the history advertisement emails, the server can then determine whether the email is an advertisement email according to method (II). Once the email is determined as an advertisement email according to method (II), the determination can be used as a final result.

It is noted that, the server can use any one of the methods (I), (II), and (III) to determine whether the email is an advertisement email, although any suitable methods can be used and included herein without limitations.

In Step 204, when the email box does not contain any advertisement email, a notification message is outputted configured to notify that the email box does not contain any advertisement email.

When determining that the email box does not contain any advertisement email, the server can send the notification message to the terminal device to display the notification message. The displaying of notification message can include, for example, a pop up notification window containing information of "no advertisement email currently in your email box", or sending a notification voice containing information of "no advertisement email currently in your email box". Any suitable methods for displaying the notification message can be encompassed in the present disclosure without any limitations.

In Step 205, when the email box contains the advertisement email, the sender address and the email subject of the advertisement email are obtained.

In various embodiments, in Step 205, when the email box contains the advertisement email, the sender address and the email subject corresponding to the advertisement email can be obtained from a storing unit corresponding to the email box. In practical applications, metadata data of the advertisement email can be obtained via the email box metadata service by the server. The metadata data can contain the sender address, the email subject, and any information of the email.

For example, the email box can contain 6 advertisement emails and the email information of the advertisement emails obtained by the server can be listed in Table 1.

TABLE 1

| Email number | Sender address | Email subject |
| --- | --- | --- |
| Email 1 | address3@zhihu.com | Subject 1 |
| Email 2 | address1@facebook.com | Subject 2 |
| Email 3 | address2@dajie.com | Subject 3 |
| Email 4 | address2@dajie.com | Subject 4 |
| Email 5 | ddress1@facebook.com | Subject 5 |
| Email 6 | address1@facebook.com | Subject 6 |

Further, to increase a speed of obtaining email information of advertisement emails, after obtaining the email information of the advertisement emails, the server can cache the email information of the advertisement emails. In this case, Step 205 can be replaced by the following exemplary steps.

When the email box contains the advertisement email, the server reads the email information of the advertisement emails cached by the server from the cache. When a time reaches a first pre-set time interval, the server deletes the cached email information of the advertisement emails. For example, the first pre-set time can be set as one minute, that is, the server stores the obtained email information of the advertisement emails in the cache for one minute. After this one minute, the server can automatically delete the email information. In this case, the speed of obtaining the email information can be assured and the cache space is occupied for a desirable short time. In various embodiments, the first pre-set time interval can be configured when originally developed. Alternatively, the first pre-set time interval can be configured and/or adjusted by a user during operation, without any limitations. Accordingly, after obtaining the email information of the advertisement emails, in Step 205, the email information of the advertisement emails cached in the server can be further updated.

In Step 206, according to the sender addresses, the advertisement emails can be classified to form advertisement-email sets. Each advertisement-email set contains at least one advertisement email, and the at least one advertisement email in a same advertisement-email set has a same sender address.

Specifically, according to the sender addresses, the server can classify the advertisement emails having the same sender address into a set or a category, e.g., to form an advertisement-email set. After the classification, the server obtains one or more non-empty advertisement-email sets. Advertisement emails in a same advertisement-email set can have a same sender address. Sender addresses of the advertisement emails in different advertisement-email sets are different.

Based on the example listed in Table 1, when the server classifies the advertisement emails, according to the sender address of the advertisement email, the sender address of email 1 is different with other addresses of the advertisement emails in Table 1. Email 1 can thus be individually set as an advertisement-email set 1. The sender addresses of email 2, email 5, and email 6 in Table 1 are the same, email 2, email 5, and email 6 are then classified as one category and as the advertisement-email set 2. The sender addresses of email 3 and email 4 are the same, and are different from the sender address in the advertisement-email set 2, email 3 and email 4 are then classified as one category and as an advertisement-email set 3. Apparently, the sender addresses of the advertisement emails in each individual set of the advertisement-email sets 1, 2, and 3 are the same, but different advertisement-email sets have different sender addresses. In this manner, after the classification process of Table 1, the advertisement-email sets obtained by the server can be listed in Table 2.

TABLE 2

| Advertisement-email set | Emails contained in advertisement-email set | | |
|---|---|---|---|
| Advertisement-email set 1 | Email 1 | address3@zhihu.com | Subject 1 |
| Advertisement-email set 2 | Email 2 | address1@facebook.com | Subject 2 |
| | Email 5 | address1@facebook.com | Subject 5 |
| | Email 6 | address1@facebook.com | Subject 6 |
| Advertisement-email set 3 | Email 3 | address2@dajie.com | Subject 3 |
| | Email 4 | address2@dajie.com | Subject 4 |

In Step 207, an email amount of the at least one advertisement email in each advertisement-email set is counted. According to the advertisement-email sets obtained by the classification, the email amount of the at least one advertisement email in each advertisement-email set can be counted. In this case, the classification data of the advertisement emails obtained by the server can include the sender addresses of the emails and the email amount in each advertisement-email set.

Based on the example listed in Table 2, the email amount in the advertisement-email set 1, the advertisement-email set 2, and the advertisement-email set 3 can be counted, respectively. For example, the email amount in the advertisement-email set 1 is one, the email amount in the advertisement-email set 2 is three, and the email amount of advertisement-email set 3 is two, as shown in Table 2.

In Step 208, according to an order from high to low of the email amount of the at least one advertisement email in each advertisement-email set, a sorting position of each advertisement-email set is obtained.

Specifically, according to the email amount in the advertisement-email set obtained by the classification, and according to an order from high to low of the email amount of the at least one advertisement email in each advertisement-email set, a sorting position of each advertisement-email set can be obtained.

Referring back to the example depicted in Step 207, the email amount of the advertisement-email set 1 is one, the email amount of advertisement-email set 2 is three, and the email amount of advertisement-email set 3 is two. According to an order from high to low of the email amount, the email amount of advertisement-email set 2 is the most, and the advertisement-email set 2 obtains the first sorting position. Likewise, the sorting position of advertisement-email set 3 is the second, and the sorting position of advertisement-email set 1 is the third.

After implementing Step 208, the classification data of the advertisement emails obtained by the server can include the sender addresses of the emails, the email amount, and the sorting position of the advertisement-email set. According to the classification data of the advertisement emails provided by the server, the terminal device can display the classification data of the advertisement emails according to their sorting position. The user can easily know which advertisement-email set contains the most amount advertisement emails, by checking the classification data of the advertisement emails. That is, the user can easily know which senders send more advertisement emails, so to reject the emails from these sender addresses and to process these advertisement emails with high priority.

It is noted that, the Step 208 is optional. When obtaining the classification data of the advertisement emails, the sorting position of each advertisement-email set can be obtained according to the email amount of each advertisement-email set. The terminal device can display the classification data of the advertisement emails of the advertisement-email set according to the order from high to low of the email amount. Of course, the sorting position of each advertisement-email set may not be necessarily obtained. The classification data of the advertisement emails can be directly listed, without limitations.

In Step 209, according to the sender addresses, obtaining domain name information corresponding to the sender addresses.

For example, domain name information can be obtained by the following exemplary steps. (1) According to the advertisement-email sets obtained by classification and according to a suffix of the sender address of the emails in the advertisement-email sets, source name and/or URL corresponding to the sender addresses can be obtained. (2) When the email box is not logged in, the server obtains the domain name information of all domain names that can be obtained, and stores the domain name information into a corresponding storage area for the domain name information. When the server needs to obtain the domain name information, according to the sender address, the server can read the domain name information from the storage area for the domain name information.

For illustration purposes, the advertisement-email set 1 in Table 2 can be used as an example for describing the process of obtaining the domain name information. The sender address in the advertisement-email set 1 is address3@zhihu.com, corresponding domain name is zhihu.com. According to this domain name, the server can obtain a source name "zhihu net" corresponding to the domain name from the storing module corresponding to the domain name information. The server can also obtain a URL: http://www.zhihu.com corresponding to the domain name, and can further obtain an icon corresponding to the source name. Alternatively, according to the sender address of address3@zhihu.com, the server can directly read the domain name information corresponding to the sender address from the storage area of the domain name information. Any suitable methods for obtaining the domain name information can be included herein without limitation.

After implementing Step 209, the server can obtain classification data of the advertisement emails including: sender addresses of the emails, the email amount, the sorting position, and the domain name information, of emails in advertisement-email set 1. According to the classification data of the advertisement emails provided by the server, the terminal device can display the source name and/or URL corresponding to the sender address, so that the user can clearly obtain the source name of the sender address or check the source website information of the advertisement email via the URL. According to the source name and/or the source website information, advertisement emails can be processed by the user via the terminal device.

It is noted that, Step 209 is optional. The server can obtain the domain name information corresponding to the sender address, such that the terminal device displays the source name and URL of the advertisement emails according to domain name information. Of course, the domain name information may not be necessarily obtained, and the terminal device may not display the source name and URL and may only display the sender address of the emails, the email subject, and the email amount, the sorting position etc. In this case, the user can, according to the sender address, process the advertisement emails by checking the email subject of the emails. In various embodiments, the server may or may not obtain the domain name information corresponding to the sender address, without limitations.

In Step 210, the email information of the advertisement emails further contains an email-receiving time. According to the email-receiving time of the at least one advertisement email in one advertisement-email set, a most-recently received advertisement email in the one advertisement-email set is determined. The email subject of the most-recently received advertisement email is used as a displaying title for the advertisement-email set.

Referring back to the example shown in Table 2, a receiving time of email 1 in the advertisement-email set 1 can be at 12:00 on Aug. 1, 2013. The receiving time of email 2 in the advertisement-email set 2 can be at 12:05 on Aug. 1, 2013. The receiving time of email 5 can be at 12:10 on Aug. 1, 2013. The receiving time of email 6 can be at 11:50 on Aug. 1, 2013. The receiving time of email 3 in the advertisement-email set 3 can be at 12:00 on Aug. 2, 2013. The receiving time of email 4 can be at 12:00 on Aug. 1, 2013. As such, the most-recently received advertisement email in the advertisement-email set 1 is email 1, the email subject of the email 1 can be determined as the displaying title for the advertisement-email set 1. The most-recently received advertisement email in the advertisement-email set 2 is email 5, the email subject of the email 5 can be determined as the displaying title for the advertisement-email set 2. The most-recently received advertisement email in the advertisement-email set 3 is email 3, the email subject of the email 3 can be determined as the displaying title for the advertisement-email set 3.

After implementing Step 210, the server can obtain classification data of the advertisement emails including: sender addresses of the emails, the email amount, the sorting position, the domain name information, and the displaying title of the advertisement-email set. According to the classification data of the advertisement emails provided by the server, the terminal device can display the displaying title of the advertisement-email set, such that the user can know content of the most-recently received advertisement email in the advertisement-email set, by checking the displaying title. According to the content of the most-recently received advertisement email, the user can know the type of the advertisement-email set to process the advertisement-email set according to the type of the advertisement-email set.

Further, to increase speed of obtaining classification data of the advertisement emails, the server can cache the classification of the advertisement emails after the classification data of the advertisement emails are obtained.

When a time reaches a second pre-set time interval, the cached classification data of the one or more advertisement emails can be deleted. When the inquiry instruction for inquiring the advertisement email is again received during the second pre-set time interval, the server can directly read the classification data of the advertisement email from the cache, and provide the classification data of the advertisement email to the user.

For example, the second pre-set time interval can be set for two minutes. The server can store the obtained classification data of the advertisement emails in the cache for two minutes. When once again receiving the inquiry instruction for inquiring the advertisement email within these two minutes, the sever can directly read the classification data of the advertisement email from the cache, and provide the classification data of the advertisement email to the user. After storing the classification data in the cache for the two minutes, the server can automatically delete the classification data of the advertisement emails.

In this case, the speed of inquiring the advertisement email(s) can be assured and the cache space is occupied for a desirable short time. In various embodiments, the second pre-set time interval can be configured when originally developed. Alternatively, the second pre-set time interval can be configured and/or adjusted by a user during operation, without any limitations. Accordingly, after obtaining the classification data of the advertisement emails, in Step 210, the classification data of the advertisement emails cached in the server can be further updated.

It is noted that, Step 210 is optional. The server can obtain the displaying title of the advertisement-email set, such that the terminal device can display the displaying title of the advertisement-email set for the user to process the advertisement emails according to the displaying title. Of course, the server may not necessarily obtain the displaying title of the advertisement-email set; the terminal device may not display the displaying title of the advertisement-email set; and the user may process the advertisement emails according to the source name, URL, and any suitable information of the advertisement emails. In various embodiments, the server may or may not obtain the displaying title of the advertisement-email set.

The exemplary Steps 205-210 provide a process that the server obtains email information of the advertisement emails, and obtains classification data of the advertisement emails by organizing and sorting the email information. The classification data of the advertisement emails obtained by the server can include the sender addresses, the email amount, the sorting position, the domain name information, and/or the displaying title of emails in the advertisement-email set.

In Step 211, the one or more advertisement emails can be displayed according to the classification data of the one or more advertisement emails.

When the user accesses an email box on a webpage, the classification data of the advertisement emails can be displayed on an inquiry page for inquiring advertisement email(s). Referring to FIG. 4, the displaying content on the inquiry page for inquiring advertisement email(s) can include the source name corresponding to the email sender address, the URL corresponding to the sender address, the email amount (i.e., how many emails) contained in the advertisement-email set, the most-recently received advertisement email subject in the advertisement-email set, and the operation processed to the advertisement-email set, etc. According to the order from high to low, the classification data of the advertisement email in each advertisement-email set can be displayed. Using this inquiry page, the user can process the advertisement emails by inquiring the source of the advertisement email, checking the history emails sent from the advertisement email sender, checking the most-recently email sent from the sender, the sender, etc.

Further, the server may receive processing instruction(s) including, e.g., a status modifying instruction, a deleting instruction or a moving instruction for processing a certain advertisement email set. The server can process the advertisement email in the advertisement-email set according to the processing instruction. For example, when receiving the status modifying instruction, which may instruct to modify an unread status of the advertisement email in the advertisement-email set into a read status, the server can modify status of all advertisement emails in the advertisement-email set. When receiving the deleting instruction, the server can delete all advertisement emails in the advertisement-email set. When receiving the moving instruction, the server can move all advertisement emails in the advertisement-email set to a folder corresponding to the moving instruction. Certainly, the processing instructions can include any suitable types of instructions such that the server can simultaneously process a corresponding process to all advertisement emails in one advertisement-email set or in multiple advertisement-email sets, when receiving certain processing instruction(s).

As such, the server organizes/sorts the advertisement emails and then displays on a webpage based on the server. For example, the inquiry instruction for inquiring the advertisement email in Step 202 can be triggered on a cloud by a user to have the server implement following exemplary Steps 203-211 according to the inquiry instruction. After the advertisement emails are displayed on the cloud, when the server receives a processing operation from the user, corresponding processing instruction can be triggered according to the processing operation from the user. For an email client, the exemplary Steps 201-211 can also be implemented to local emails saved in the email client. Advertisement emails from local emails in the email client can also be displayed and further processed.

In fact, the process of organizing/sorting and displaying advertisement emails can be realized by interactions between a terminal device and the server. For example, in Step 202, the inquiry instruction for inquiring advertisement emails can be triggered by the user at the terminal device and sent to the server by the terminal device to have the server implement following exemplary Steps 203-210 according to the inquiry instruction. After receiving the classification data of the advertisement emails, the server can send the classification data of the advertisement emails to the terminal device for the terminal device to display according to the received classification data. After the terminal device displays the advertisement emails, when the user triggers any processing operation on the terminal device, the terminal device can send the corresponding processing instruction to the server for the server to process the advertisement emails according to the processing instruction.

The classification data of the advertisement email shown in FIG. 4 are the classification data of the advertisement emails (after all possible steps described herein) finally obtained by the server. In FIG. 4, advertisement emails are displayed according to the sorting position obtained in Step 208, according to the source name and URL corresponding to the sender address and obtained according to the sender address of the advertisement emails in Step 209, and according to the displaying title determined by the email subject of the most-recently received advertisement email in Step 210 (of FIG. 2). As indicated by FIG. 4, the advertisement-email set 2 and the advertisement-email set 3 have emails with a same sender address, a same source name corresponding to the sender address, and a same URL. For example, according to the sender address address1@facebook.com of the email in the advertisement-email set 2, a name domain that the server can obtain corresponding to the sender address is facebook.com, while according to the sender address address1@facebook.com of the email in the advertisement-email set 3, the server obtains a domain name of facebook.com corresponding to the sender address. According to the same domain name corresponding to the sender addresses, the server can obtain same domain name information corresponding to the sender addresses.

In addition, the server provides URL icon and/or any suitable information. For example, in FIG. 4, icon 1 indicates an icon of website of "facebook", icon 2 indicates an icon of the "zhihu net" website. The server can further provide operation options for processing advertisement emails, such as a deleting option, a marking as read option, a rejecting option, etc. Note that FIG. 4 only depicts a rejecting option for process the advertisement emails for illustration purposes. In other embodiments, the server can provide options for deleting the advertisement emails, for marking the advertisement email as read, etc., such that the terminal device can process correspondingly to delete the advertisement emails, to mark the advertisement email as read, etc. The terminal device can provide corresponding displaying data to display processing keys for deleting and marking the advertisement email for the user to choose. Of course, operation options for processing the advertisement emails are not limited in the present disclosure.

Note that although the disclosed methods are described with respect to advertisement emails, any other types of emails (for example, indiscernible advertisement emails) can also be implemented according to the disclosed methods.

The disclosed methods for email management can organize/sort email information of advertisement emails in an email box to obtain classification data of the advertisement emails. According to the classification data, advertisement emails can be displayed all together for a user to process the advertisement emails all together without individually identifying the emails one after another. Such process for handling advertisement emails can be convenient and fast with improved processing efficiency. Error deletion of normal emails and missed deletion of advertisement emails can be avoided. Storage space of the email box can be saved.

Figure 5:
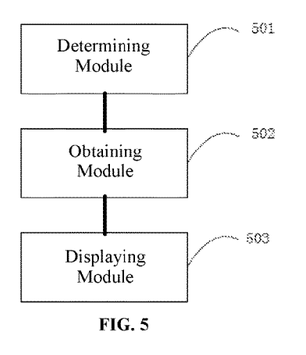
FIG. 5 depicts an exemplary email management device consistent with various disclosed embodiments.

FIG. 5 depicts an exemplary email management device consistent with various disclose embodiments. The exemplary device in FIG. 5 can include a determining module 501, an obtaining module 502, and/or a displaying module 503.

The determining module 501 is configured to determine whether the email box contains one or more advertisement emails according to email information of emails in an email box. The email information at least contains sender addresses of the emails.

The determining module 501 connects with the obtaining module 502. The obtaining module 502 is configured, when the email box contains one or more advertisement emails, to obtain classification data of the one or more advertisement emails according to the email information of the one or more advertisement emails.

The obtaining module 502 connects with the displaying module 503. The displaying module 503 is configured to display the one or more advertisement emails according to the classification data of the one or more advertisement emails.

Optionally, the obtaining module 502 includes a first obtaining unit, a classifying unit and/or a counting unit. For example, the first obtaining unit is configured to obtain the email information of the one or more advertisement emails.

The classifying unit is configured to classify the one or more advertisement emails to obtain one or more advertisement-email sets according to the sender addresses contained in the email information of the one or more advertisement emails. Each advertisement-email set contains at least one advertisement email, and the at least one advertisement email in a same advertisement-email set has a same sender address.

The counting unit is configured to count an email amount of the at least one advertisement email in each advertisement-email set.

Optionally, the obtaining module 502 further includes a second obtaining unit. The second obtaining unit is configured to obtain domain name information corresponding to the sender addresses according to the sender address.

Optionally, the obtaining module 502 further includes a sorting unit. The sorting unit is configured to obtain a sorting position of each advertisement-email set according to an order from high to low of the email amount of the at least one advertisement email in each advertisement-email set.

Optionally, the obtaining module 502 further includes a first determining unit and a second determining unit.

The first determining unit is configured to determine a most-recently received advertisement email in one advertisement-email set according to the email-receiving times of the at least one advertisement email in the one advertisement-email set. The second determining unit is configured to determine the email subject of the most-recently received advertisement email as a displaying title for the advertisement-email set.

Optionally, the exemplary device is further configured to trigger the determining module 501: when an inquiry instruction for inquiring an advertisement email is received, and/or after every interval of a pre-set period of time; and/or when the email box receives a newly-added advertisement email.

Optionally, the exemplary device further includes a notifying module connected with the determining module 501 and configured to output a notification message when the email box does not contain an advertisement email. The notification message is configured to notify that the email box does not contain any advertisement email.

Optionally, the first obtaining unit is further configured to cache the email information of the one or more advertisement emails, and, when a time reaches a first pre-set time interval, to delete the cached email information of the one or more advertisement emails.

Optionally, the obtaining module 502 is further configured to cache the classification data of the one or more advertisement emails. The obtaining module 502 is further configured to delete the cached classification data of the one or more advertisement emails when a time reaches a second pre-set time interval.

Optionally, an email in the email box is determined to be the advertisement email when following conditions are all satisfied for the email having the sender address that a history amount of recipients of the email sent from the sender address is greater than a first pre-set threshold value, a ratio of a history amount for sending the email over the history amount of the recipients is greater than a second pre-set threshold value, and a ratio of a history amount for receiving the email over the history amount of the recipients is less than a third pre-set threshold value.

Alternatively, an email in the email box is determined to be the advertisement email, when following conditions are all satisfied for the email having the sender address that a history amount of recipients of the email sent from the sender address is greater than a first pre-set threshold value, a ratio of a history amount for reading the email over a history amount of the recipients is greater than a second pre-set threshold value, and a ratio of a history amount for receiving the email over the history amount of the recipients is less than the third pre-set threshold value.

Figure 6:
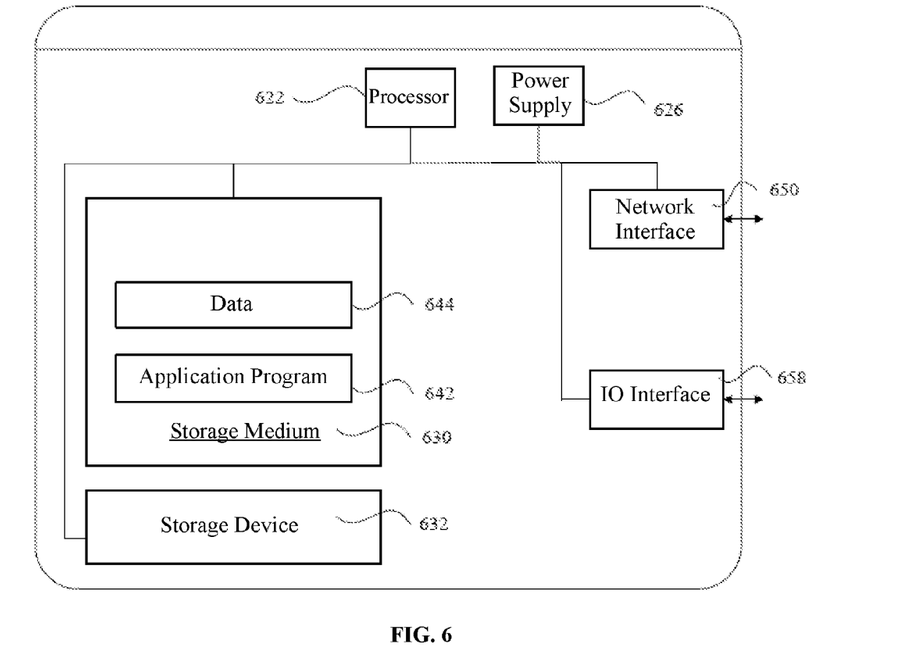
FIG. 6 depicts an exemplary server consistent with various disclosed embodiments.

The disclosed embodiments can be combined in any manner as desired. In various embodiments, the disclosed device for email management can further include one or more processors and a non-transitory computer-readable storage medium having instructions stored thereon. The instructions executed by the one or more processors and comprising the determining module, the obtaining module, and the displaying module. In one embodiment, the device for email management includes a server. FIG. 6 depicts an exemplary server consistent with various disclosed embodiments.

The exemplary server 600 can be configured with various configurations and functions. In one embodiment, the server 600 can include one or more CPUs (central processing units), e.g., processors 622, a storage device 632, and one or more storage medium 630 for storing application programs 642 and/or data 644.

The storage device 632 and the storage medium 630 (e.g., a non-transitory computer-readable storage medium) may be transitory or non-transitory. Programs stored in the storage medium 630 can include one or more modules (e.g., those in FIG. 5). Each module can include instruction for operations of the server.

Further, the processor 622 can be configured to communicate with the storage medium 630 to implement a series of instructions (e.g., corresponding to the disclosed methods) stored in the storage medium 630 on the server 600. Processor 622 can include any appropriate processor or processors. Further, processor 622 can include multiple cores for multi-thread or parallel processing. Storage medium 630 can include memory modules, such as ROM, RAM, and flash memory modules, and mass storages, such as CD-ROM, U-disk, removable hard disk, etc. Storage medium 630 can store computer programs for implementing various processes, when executed by processor 622.

Figure 7:
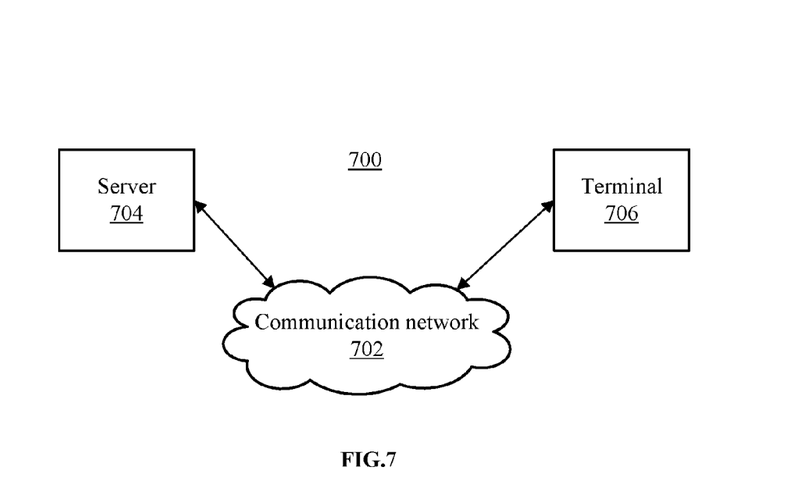
FIG. 7 depicts an exemplary environment incorporating certain disclosed embodiments.

Server 600 can also include one or more power supplies 626, one or more wired or wireless network interfaces 650, one or more input-output interfaces 658. The one or more wired or wireless network interfaces 650 are configured to connect to a network (e.g., as shown in FIG. 7). The one or more input-output interfaces 658 are configured based on a queue, to transmit instructions to the processor 622 to process, e.g., to send the received e-mails to the storage device 632 for storing.

For example, the processor(s) 622 of the server 600 can upload executable files corresponding to processes of one or more programs to the storage device 632. The processor(s) 622 can then be used to run these one or more programs stored in the storage device 632. For example, the processor(s) 632 can cause the exemplary server 600 to perform the disclosed email management methods, e.g., as depicted in FIGS. 1-2.

In various embodiments, the methods and devices for email management can be implemented in an environment 700 as shown in FIG. 7. FIG. 7 depicts an exemplary environment 700 incorporating certain disclosed embodiments. As shown in FIG. 7, environment 700 can include a server 704, a terminal 706, and a communication network 702. The server 704 and the terminal 706 may be coupled through the communication network 702 for information exchange, such as webpage browsing, Internet searching, data downloading, etc. Although only one terminal 706 and one server 704 is shown in the environment 700, any number of terminals 706 or servers 704 may be included, and other devices may also be included.

Communication network 702 may include any appropriate type of communication network for providing network connections to the server 704 and terminal 706 or among multiple servers 704 or terminals 706. For example, communication network 702 may include the Internet or other types of computer networks or telecommunication networks, either wired or wireless.

The terminal 706 can refer to any appropriate user terminal device with certain computing capabilities, such as a personal computer (PC), a work station computer, a server computer, a hand-held computing device (tablet), a smart phone or mobile phone, or any other user-side computing device. The terminal 706 can include any terminal device as mentioned above for the methods and devices for managing emails.

The server 704 can refer one or more server computers configured to provide certain server functionalities, such as database management and search engines. The server may also include one or more processors to execute computer programs in parallel. The server 704 can include device and server of FIGS. 5-6. The server 704 and the terminal 706 can be implemented on any appropriate computing platform.

In a certain embodiment, to distinguish normal emails from advertisement emails, an exemplary background server can provide a terminal device (or a user) with data organizing function to organize two types of data. One type of data includes basic email information, such as, for example, sender addresses, email subjects, and/or other suitable information is stored in a certain basic module of the email box. Another type of data includes URL information of a domain name corresponding to the sender address, such as a URL, website icon, etc. These data can be prepared by operating off-line programs.

In a certain embodiment, when a user submits a request for inquiring advertisement emails, backend server can request metadata service of the email box to fetch and cache all the metadata of the advertisement emails of the user. The backend server can then fetch domain name information corresponding to the sender address from a storage module for storing email domain name information for organizing and sorting according to the email amount received and then cache. The resulting data (email data) can then be returned to the user/terminal device. Data needed by the user can be stored in the cache for one minute and auto cleared after this one minute. As such, inquiring speed can be provided. When a new email is coming, data can be re-organized to provide the user with the latest data.

It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

In the present disclosure each embodiment is progressively described, i.e., each embodiment is described and focused on difference between embodiments. Similar and/or the same portions between various embodiments can be referred to with each other. In addition, exemplary device and/or systems are described with respect to corresponding methods.

The disclosed methods, device, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

As used herein, the term "module" or "unit" can be software objects executed on a computing system. A variety of components described herein including elements, modules, units, engines, and services can be executed in the computing system. The methods, device, and/or systems can be implemented in a software manner. Of course, the methods, device, and/or systems can be implemented using hardware. All of which are within the scope of the present disclosure.

A person of ordinary skill in the art can understand that the units/modules included herein are described according to their functional logic, but are not limited to the above descriptions as long as the units/modules can implement corresponding functions. Further, the specific name of each functional module is used to be distinguished from one another without limiting the protection scope of the present disclosure.

In various embodiments, the disclosed units/modules can be configured in one device (e.g., a processing unit) or configured in multiple devices as desired. The units/modules disclosed herein can be integrated in one unit/module or in multiple units/modules. Each of the units/modules disclosed herein can be divided into one or more sub-units/modules, which can be recombined in any manner. In addition, the units/modules can be directly or indirectly coupled or otherwise communicated with each other, e.g., by suitable interfaces.

One of ordinary skill in the art would appreciate that suitable software and/or hardware (e.g., a universal hardware platform) may be included and used in the disclosed methods, device, and/or systems. For example, the disclosed embodiments can be implemented by hardware only, which alternatively can be implemented by software products only. The software products can be stored in computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

For example, the disclosed methods can be implemented by a device (e.g., a server) including one or more processor, and a non-transitory computer-readable storage medium having instructions stored thereon. The instructions can be executed by the one or more processors of the device to implement the methods disclosed herein. In some cases, the instructions can include one or more modules corresponding to the disclosed methods.

Note that, the term "comprising", "including" or any other variants thereof are intended to cover a non-exclusive inclusion, such that the process, method, article, or device containing a number of elements also include not only those elements, but also other elements that are not expressly listed; or further include inherent elements of the process, method, article or device. Without further restrictions, the statement "includes a . . . " does not exclude other elements included in the process, method, article, or device having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods and devices for email management are provided. Whether an email box contains one or more advertisement emails is determined according to email information of emails in an email box. The email information at least contains sender addresses of the emails. When the email box contains the one or more advertisement emails, classification data of the one or more advertisement emails are obtained according to the email information of the one or more advertisement emails. The one or more advertisement emails are displayed according to the classification data thereof. Accordingly, the email managing device includes a determining module, an obtaining module, and a displaying module.

The disclosed methods and devices for email management can organize/sort email information of advertisement emails in an email box to obtain classification data of the advertisement emails. According to the classification data, advertisement emails can be displayed all together for a user to process the advertisement emails all together without individually identifying the emails one after another. For example, by a same management interface, a user can process inquiry for source of an email, for history sent-emails from a sender, and/or for the most-recently sent-email from the sender. The user can thus perform rejections via a terminal device. An inquiry page for inquiring advertisement emails can include a self-help inquiry option on the email box home page. The inquiry page can further include options for source name, URL, email amount, most-recent emails, rejection operation, etc.

Such process for handling advertisement emails can be convenient and fast with improved processing efficiency. Error deletion of normal emails and missed deletion of advertisement emails can be avoided. Storage space of the email box can be saved.

REFERENCE SIGN LIST

Determining module 501
Obtaining module 502
Displaying module 503
Server 600
Processor 622
Power supply 626
Storage medium 630
Storage device 632
Application programs 642
Data 644
Network interface 650
I/O interface 658
Environment 700
Communication network 702
Server 704
Terminal 706

What is claimed is:

1. An email management method, comprising:
   providing an email management user interface for a user to operate, the email management user interface including a self-help inquiry option icon;
   when the self-help inquiry option icon is selected by the user, accessing and displaying a self-help inquiry webpage, the self-help inquiry webpage including an advertisement email inquiry option icon;
   when the advertisement email inquiry option icon is selected by the user, determining whether an email box contains one or more advertisement emails according to email information of emails in the email box, wherein the email information at least contains sender addresses of the emails;
   caching the one or more advertisement emails in a cache space of a server;
   after a first pre-set time interval, automatically deleting the one or more advertisement emails from the cache space of the server;
   when the email box contains the one or more advertisement emails, obtaining classification data of the one or more advertisement emails by obtaining the email information of the one or more advertisement emails;
   caching the classification data of the one or more advertisement emails in the cache space of the server;
   after a second pre-set time interval, automatically deleting the classification data of the one or more advertisement emails from the cache space of the server;
   classifying the one or more advertisement emails, according to the sender addresses thereof, to form one or more advertisement-email sets with each set containing at least one advertisement email, wherein the at least one advertisement email in a same advertisement-email set has a same sender address; and
   displaying the one or more advertisement emails in the self-help inquiry webpage according to the classification data thereof.

2. The method according to claim 1, wherein the step of obtaining the classification data of the one or more advertisement emails further comprises:
   counting an email amount of the at least one advertisement email in each advertisement-email set.

3. The method according to claim 1, wherein, after obtaining the email information of the one or more advertisement emails, the method further comprises:
   according to the sender addresses, obtaining domain name information corresponding to the sender addresses.

4. The method according to claim 2, wherein, after counting the email amount of the at least one advertisement email in each advertisement-email set, the method further comprises:

according to an order from high to low of the email amount of the at least one advertisement email in each advertisement-email set, obtaining a sorting position for each advertisement-email set.

5. The method according to claim 1, wherein:
the email information of the one or more advertisement emails further comprises an email-receiving time and an email subject, and
after obtaining the email information of the one or more advertisement emails, the method further comprises:
according to the email-receiving times of the at least one advertisement email in one advertisement-email set, determining a most-recently received advertisement email in the one advertisement-email set; and
using the email subject of the most-recently received advertisement email as a displaying title for the one advertisement-email set.

6. The method according to claim 1, wherein, prior to the step of determining whether the email box contains the one or more advertisement emails according to the email information of the emails in the email box, the method further comprises one or more of following steps:
when an inquiry instruction for inquiring an advertisement email is received, implementing the step of determining whether the email box contains the one or more advertisement emails;
after every interval of a pre-set period of time, implementing the step of determining whether the email box contains the one or more advertisement emails; and
when the email box receives a newly-added advertisement email, implementing the step of determining whether the email box contains the one or more advertisement emails.

7. The method according to claim 1, wherein, after the step of determining whether the email box contains the one or more advertisement emails according to the email information of the emails in the email box, the method further comprises:
when the email box does not contain an advertisement email, outputting a notification message, wherein the notification message is configured to notify that the email box does not contain any advertisement email.

8. The method according to claim 1, further comprising:
determining an email in the email box is the advertisement email, when following conditions are all satisfied for the email having the sender address that:
a history amount of recipients of the email sent from the sender address is greater than a first pre-set threshold value,
a ratio of a history amount for sending the email over the history amount of the recipients is greater than a second pre-set threshold value, and
a ratio of a history amount for receiving the email over the history amount of the recipients is less than a third pre-set threshold value.

9. The method according to claim 1, further comprising:
determining an email in the email box is the advertisement email, when following conditions are all satisfied for the email having the sender address that:
a history amount of recipients of the email sent from the sender address is greater than a first pre-set threshold value,
a ratio of a history amount for reading the email over a history amount of the recipients is greater than a second pre-set threshold value, and
a ratio of a history amount for receiving the email over the history amount of the recipients is less than the third pre-set threshold value.

10. A non-transitory computer-readable storage medium comprising instructions stored thereon, wherein, when being executed, the instructions cause one or more processors of a server to perform the method according to claim 1.

11. An email managing device, comprising:
a memory; and
a processor coupled to the memory, the processor is configured to:
provide an email management user interface for a user to operate, the email management user interface including a self-help inquiry option icon;
when the self-help inquiry option icon is selected by the user, access and display a self-help inquiry webpage, the self-help inquiry webpage including an advertisement email inquiry option icon;
when the advertisement email inquiry option icon is selected by the user, determine whether an email box contains one or more advertisement emails according to email information of emails in the email box, wherein the email information at least contains sender addresses of the emails;
cache the one or more advertisement emails in a cache space of a server;
after a first pre-set time interval, automatically delete the one or more advertisement emails from the cache space of the server;
when the email box contains the one or more advertisement emails, obtain classification data of the one or more advertisement emails by obtaining the email information of the one or more advertisement emails;
cache the classification data of the one or more advertisement emails in the cache space of the server;
after a second pre-set time interval, automatically delete the classification data of the one or more advertisement emails from the cache space of the server;
classify the one or more advertisement emails, according to the sender addresses thereof, to form one or more advertisement-email sets with each set containing at least one advertisement email, wherein the at least one advertisement email in a same advertisement-email set has a same sender address; and
display the one or more advertisement emails in the self-help inquiry webpage according to the classification data thereof.

12. The device according to claim 11, wherein the processor is further configured to:
count an email amount of the at least one advertisement email in each advertisement-email set.

13. The device according to claim 11, wherein the processor is further configured to:
obtain domain name information corresponding to the sender addresses according to the sender address.

14. The device according to claim 12, wherein the processor is further configured to:
obtain a sorting position of each advertisement-email set according to an order from high to low of the email amount of the at least one advertisement email in each advertisement-email set.

15. The device according to claim 11, wherein:
the email information of the one or more advertisement emails further contains an email-receiving time and an email subject, and the processor is further configured to:
- determine a most-recently received advertisement email in one advertisement-email set according to the email-receiving times of the at least one advertisement email in the one advertisement-email set, and
- determine the email subject of the most-recently received advertisement email as a displaying title for the advertisement-email set.

16. The device according to claim 11, wherein the determine whether the email box contains one or more advertisement emails according to email information of emails in an email box, is triggered in a condition comprising one or more of:
- when an inquiry instruction for inquiring an advertisement email is received;
- after every interval of a pre-set period of time; and
- when the email box receives a newly-added advertisement email.

17. The device according to claim 11, the processor is further configured to:
- output a notification message when the email box does not contain an advertisement email, wherein the notification message is configured to notify that the email box does not contain any advertisement email.

18. The device according to claim 11, wherein an email in the email box is determined to be the advertisement email, when following conditions are all satisfied for the email having the sender address that:
- a history amount of recipients of the email sent from the sender address is greater than a first pre-set threshold value,
- a ratio of a history amount for sending the email over the history amount of the recipients is greater than a second pre-set threshold value, and
- a ratio of a history amount for receiving the email over the history amount of the recipients is less than a third pre-set threshold value.

19. The device according to claim 11, wherein an email in the email box is determined to be the advertisement email, when following conditions are all satisfied for the email having the sender address that:
- a history amount of recipients of the email sent from the sender address is greater than a first pre-set threshold value,
- a ratio of a history amount for reading the email over a history amount of the recipients is greater than a second pre-set threshold value, and
- a ratio of a history amount for receiving the email over the history amount of the recipients is less than the third pre-set threshold value.

* * * * *